United States Patent
Kobayashi et al.

(10) Patent No.: US 7,173,710 B2
(45) Date of Patent: Feb. 6, 2007

(54) INCLINATION ADJUSTING APPARATUS, FERRULE CLAMPING APPARATUS, AND INTERFEROMETER APPARATUS EQUIPPED WITH THEM

(75) Inventors: Fumio Kobayashi, Saitama (JP); Kunihiko Tanaka, Saitama (JP)

(73) Assignee: Fujinon Corporation, Saitama (JP)

( * ) Notice: Subject to any disclaimer, the term of this patent is extended or adjusted under 35 U.S.C. 154(b) by 368 days.

(21) Appl. No.: 10/440,359

(22) Filed: May 19, 2003

(65) Prior Publication Data
US 2003/0227634 A1 Dec. 11, 2003

(30) Foreign Application Priority Data
Jun. 7, 2002 (JP) .............................. 2002-167126
Jun. 7, 2002 (JP) .............................. 2002-167731

(51) Int. Cl.
*G01B 9/02* (2006.01)
(52) U.S. Cl. ...................................... 356/450; 411/393

(58) Field of Classification Search ................ 356/450; 384/609; 411/393, 378
See application file for complete search history.

(56) References Cited

U.S. PATENT DOCUMENTS 1,357,562 A * 11/1920 Hope .......................... 384/609

\* cited by examiner

*Primary Examiner*—Hwa (Andrew) Lee
(74) *Attorney, Agent, or Firm*—Snider & Associates; Ronald R. Snider

(57) ABSTRACT

In an inclination adjusting apparatus comprising two base members opposing each other, an adjusting screw for relatively inclining the two base members with respect to each other is rotatably threaded into and held by one of the two base members while projecting a leading end part from the one base member toward the other base member. The other base member is provided with a sphere-bearing surface opposing the leading end part of the adjustment screw. A rigid spherical member is held between the adjustment screw and the sphere-bearing surface.

7 Claims, 10 Drawing Sheets

INCLINATION ADJUSTING APPARATUS, FERRULE CLAMPING APPARATUS, AND INTERFEROMETER APPARATUS EQUIPPED WITH THEM

RELATED APPLICATIONS

This application claims the priority of Japanese Patent Application Nos. 2002-167126 and 2002-167731 both filed on Jun. 7, 2002, which are incorporated herein by reference.

BACKGROUND OF THE INVENTION

1. Field of the Invention

The present invention relates to an inclination adjusting apparatus used for adjusting the inclination of a ferrule held at a predetermined position in front of an objective lens when analyzing the form or the like of a leading end part of the ferrule accommodated within an optical connector plug by using a microscopic interferometer apparatus (also known as "interferometric microscope apparatus"), for example; and a microscopic interferometer apparatus equipped with this kind of inclination adjusting apparatus.

The present invention also relates to a ferrule clamping apparatus for holding a ferrule at a predetermined position in front of an objective lens when analyzing the form or the like of a leading end part of the ferrule accommodated within an optical connector plug by using a microscopic interferometer apparatus; and a microscopic interferometer apparatus equipped with this clamping apparatus.

2. Description of the Prior Art

Research and development of optical fibers used for optical communications have recently been well underway. Known as an example of this kind of optical fibers is one comprising a core having an outer diameter of about 10 μm; and cladding layer, disposed at the outer periphery of the core, having an outer diameter of about 125 μm; whereas the optical fiber is further equipped with a ferrule, disposed at a connecting end part thereof, for connecting the optical fiber to anoher optical fiber.

The ferrule is a cylindrical component constituting an optical connector for holding and securing one end of the optical fiber in order to connect the optical fiber to another optical fiber. After an optical fiber is inserted and secured with an adhesive or the like to the center part of the outer diameter of a ferrule, the leading end of the ferrule is polished into a mirror surface, so that two optical fibers held by respective ferrules can be connected to each other when the leading end faces of the two ferrules are butted against each other.

While the leading end face of the ferrule has been known to be polished into a plane orthogonal to the optical axis or a plane obliquely intersecting the optical axis, attention has recently been directed to one whose leading end face is subjected to PC (physical contact) polishing so as to attain a convex spherical form such that the leading end face is elastically deformed by a pressure for butting the leading end faces of ferrules against each other.

For reducing the optical loss occurring when optical fibers are connected to each other, various high-precision specs have been defined by JIS. For the PC-polished ferrule, six μm-order specs such as dimensional errors in the radius of curvature of the leading end face and positional deviation errors between the apex of the spherical leading end face of the ferrule and the center of the core of the optical fiber (the center of the fiber outer form) have been defined.

There are cases where microscopic interferometer apparatus are used for inspecting whether produced ferrules conform to the specs or not. A microscopic interferometer apparatus has been configured such that object light carrying phase information such as the surface form and refractive index distribution of a minute sample and reference light are caused to interfere with each other, thus obtained interference fringes are observed, and forms and changes of the interference fringes are measured and analyzed, so as to attain the phase information of the sample.

When inspecting a produced ferrule by using such a microscopic interferometer apparatus, an inclination adjusting apparatus for adjusting the relative inclination between the optical axis of the microscopic interferometer apparatus and the optical axis of the ferrule is necessary.

Conventionally known as such an inclination adjusting apparatus is one comprising two base members opposing each other so as to be inclinable with respect to each other while using their supporting part as a fulcrum, and an adjustment screw having a leading end face formed into a convex spherical surface. The adjustment screw is rotatably threaded into and held by one of the base members while the leading end face projects toward the other base member. While the leading end face is in slidable contact with the bearing surface on the other base member side, the adjustment surface is rotated so as to change the length of projection, thereby adjusting the relative inclination between the two base members.

However, the following problem may exist in such a conventional inclination adjusting apparatus since the leading end face of the adjustment screw is formed into a convex spherical surface. Namely, when the center of the convex spherical surface at the adjustment screw leading end deviates from the axis of the adjustment screw, the diametric center of the convex spherical surface rotates about the adjustment screw axis as the adjustment screw rotates. When the bearing surface on the other base member side coming into contact with such an eccentric convex spherical surface is formed into a groove having a V-shaped cross section, it restricts the sliding of the convex spherical surface to only a predetermined direction (in which the groove extends). Therefore, when the adjustment screw is rotated, a force may act to press the bearing surface to a direction substantially orthogonal to the predetermined direction. Such a force may cause the two base members to shift relative to each other, thereby adversely affecting the inclination adjustment.

The amount of eccentricity of the convex spherical surface at the adjustment screw leading end is usually so small that the amount of relative positional deviation between two base members mentioned above seems to be kept small. When the form of the ferrule is measured by using the above-mentioned microscopic interferometer apparatus, however, even a minute positional deviation occurring when adjusting the inclination of the ferrule may greatly affect the measurement, since it is necessary for the ferrule leading end part to be held with a high accuracy at a predetermined position in front of the objective lens of the microscopic interferometer apparatus.

On the other hand, when inspecting a produced ferrule by using such a microscopic interferometer apparatus, a clamping apparatus is necessary for holding the ferrule to be inspected at a predetermined position in front of the objective lens of the microscopic interferometer apparatus with a high positional accuracy. Since the ferrule is usually accommodated within a tubular member constituting an optical connector plug, the ferrule clamping apparatus is adapted to clamp the ferrule in a state accommodated within such a tubular member.

FIG. 13 shows a conventional example of such a ferrule clamping apparatus. FIG. 13 is a sectional view of a conventional clamping apparatus in a state holding a ferrule. The ferrule 420 shown in FIG. 13 holds and secures an end part of an optical fiber, which is not depicted, while being accommodated within a tubular member constituting an optical connector plug 400. The clamping apparatus 500 comprises a support 510 for supporting the ferrule 420 from one side thereof, a shifter 520 disposed so as to be displaceable with respect to the support 510, and a pressing member 530 for pressing the shifter 520 so as to displace the latter.

The shifter 520 opposes the support 510 across the ferrule 420, while being displaceable between a clamp position in contact with the other side of the ferrule 420 and a clamp release position separated from this side. The pressing member 530 comprises a screw shaft 531 engaging a screw hole 511 formed in the support 510, and a lever member 532 for rotating the screw shaft 531 about its axis C; and is configured so as to suppress the shifter 520 downward while in a state where a spherical leading end face of the screw shaft 531 is in contact with the upper face of the shifter 520.

In the clamping apparatus 500, the shifter 520 pressed by the pressing member 530 is displaced from the clamp release position to the clamp position, so as to abut against the other side of the ferrule 420, whereby the ferrule 420 can be held by the support 510 and the shifter 520.

The conventional clamping apparatus 500 shown in FIG. 13 may be problematic as follows. Namely, though the leading end part of the ferrule 420 accommodated within the tubular member 410 projects from the leading end of the tubular member 410, the length of projection is often very short. Though the support 510 and shifter 520 are partly extended into the tubular member 410 in order to secure a chuck margin for the ferrule 420, the line of action (coinciding with the axis C) of a force passing the pressing point P of the pressing member 530 is located on the outside of the leading end of the tubular member 410. Therefore, the position of line of action of the force may deviate from the area of ferrule 420 (area between points S and T in FIG. 13) supported by the support 510. When the pressing member 530 presses the shifter 520 in such a state, the shifter 520 may be twisted (in the direction rotating the shifter 520 clockwise in FIG. 13), which makes it difficult to hold the ferrule 420 stably or in a predetermined posture with a high accuracy.

When the ferrule is held unstably in a ferrule clamping apparatus used in a microscopic interferometer apparatus, the ferrule may shift its position during observation, thereby adversely affecting the measurement and analysis. When the ferrule is not held in a predetermined posture, highly accurate measurement and analysis cannot be carried out, either.

SUMMARY OF THE INVENTION

In view of such circumstances, it is an object of the present invention to provide an inclination adjusting apparatus which can carry out inclination adjustment with a high accuracy while restraining two base members from shifting their positions relative to each other, and a microscopic interferometer apparatus which can stably measure and analyze a minute sample necessitating inclination adjustment.

It is another object of the present invention to provide a ferrule clamping apparatus which can reliably hold at a predetermined position a ferrule accommodated within a tubular member constituting an optical connector plug; and a microscopic interferometer apparatus which can stably measure and analyze the ferrule accommodated within the tubular member.

For achieving the above-mentioned object, the present invention provides an inclination adjusting apparatus comprising two base members opposing each other, a support part for supporting the two base members such that the two base members are relatively inclinable with respect to each other, and an adjusting part for relatively inclining the two base members with respect to each other while using the support part as a fulcrum; the adjusting part comprising an adjustment screw rotatably threaded into and held by one of the two base members while projecting a leading end face from the one base member toward the other base member, a sphere-bearing surface provided in the other base member so as to oppose a leading end face of the adjustment screw, a rigid spherical member disposed between the leading end face of the adjustment screw and the sphere-bearing surface, and a holding member for holding the spherical member at a position in contact with the leading end face and the sphere-bearing surface; the adjustment screw being rotated in a state where the spherical member is in contact with the leading end face and the sphere-bearing surface, so as to change the length of projection of the adjustment screw from the one base member, thereby adjusting the relative inclination between the two base members.

The holding member may have a hole having an inner diameter smaller than the diameter of the spherical member, and may be disposed between the leading end face and the sphere-bearing surface such that the spherical member partly projects from the hole, so as to hold the spherical member.

The inclination adjusting apparatus may further comprise an urging member for urging the two base members toward each other.

Two adjusting parts may be disposed at respective positions separated from each other in directions orthogonal to each other from the support part, the sphere-bearing surface in one of the adjusting parts being formed into a flat surface in contact with the spherical member, the sphere-bearing surface in the other adjusting part being formed into a groove having a V-shaped cross section and extending in a direction connecting the other adjusting part and the support part.

The present invention provides a microscopic interferometer apparatus for observing interference fringes obtained by interference between object light carrying phase information of a sample and reference light, the microscopic interferometer apparatus comprising the inclination adjusting apparatus in accordance with the present invention.

The microscopic interferometer apparatus may further comprise a clamping apparatus for holding the sample at a predetermined position, and a clamping apparatus holder for holding the clamping apparatus, the clamping apparatus being supported by the inclination adjusting apparatus by way of the clamping apparatus holder, an inclined posture of the clamping apparatus being adjusted by the inclination adjusting apparatus.

The present invention provides a ferrule clamping apparatus for holding a ferrule accommodated within a tubular member constituting an optical connector plug, the ferrule clamping apparatus comprising a support having a first support piece for supporting the ferrule from one side; a shifter having a second support piece, disposed so as to oppose the first support piece across the ferrule supported by the first support piece while being displaceable between a clamp position in contact with the other side of the ferrule and a clamp release position separated from the other side; and a pressing member for pressing the shifter so as to displace the second support piece; wherein the first and second support pieces are formed so as to extend from the outside to inside of a leading end of the tubular member along an axis of the ferrule; wherein the shifter comprises a pressure receiving piece extending so as to oppose the second support piece across one side wall part of the tubular member; and wherein the pressing member is formed such that, when the pressure receiving piece is pressed toward the ferrule while in a state where a pressing point of the pressing member is in contact with the pressure receiving piece, the second support piece is displaced from the clamp release position to the clamp position so as to hold the ferrule with the first and second support pieces, and the first and second support pieces stop holding the ferrule when the pressing is released.

Preferably, a line of action of a force of the pressing member passing the pressing point passes a substantially center part of an area of the ferrule supported by the first support piece.

The second support piece may have a projection in contact with the other side of the ferrule on a surface opposing the first support piece.

The shifter may be movable along a guide shaft extending in a shifting direction of the second support piece, while being urged by an urging member such that the second support piece is located at the clamp release position.

The pressing member may comprise a screw shaft rotatably engaging a screw hole formed in the support and pressing the pressure receiving piece with a leading end face having the pressing point, and a lever member for rotating the screw shaft.

The ferrule clamping apparatus may further comprise a stopper for restricting a rotating area of the lever member.

In another aspect, the present invention provides a microscopic interferometer apparatus for observing interference fringes obtained by interference between object light carrying phase information of a sample and reference light, the microscopic interferometer apparatus comprising the ferrule clamping apparatus in accordance with the present invention.

DESCRIPTION OF THE PREFERRED EMBODIMENTS

In the following, embodiments of the present invention will be explained with reference to the drawings.

Microscopic Interferometer Apparatus

Figure 7:
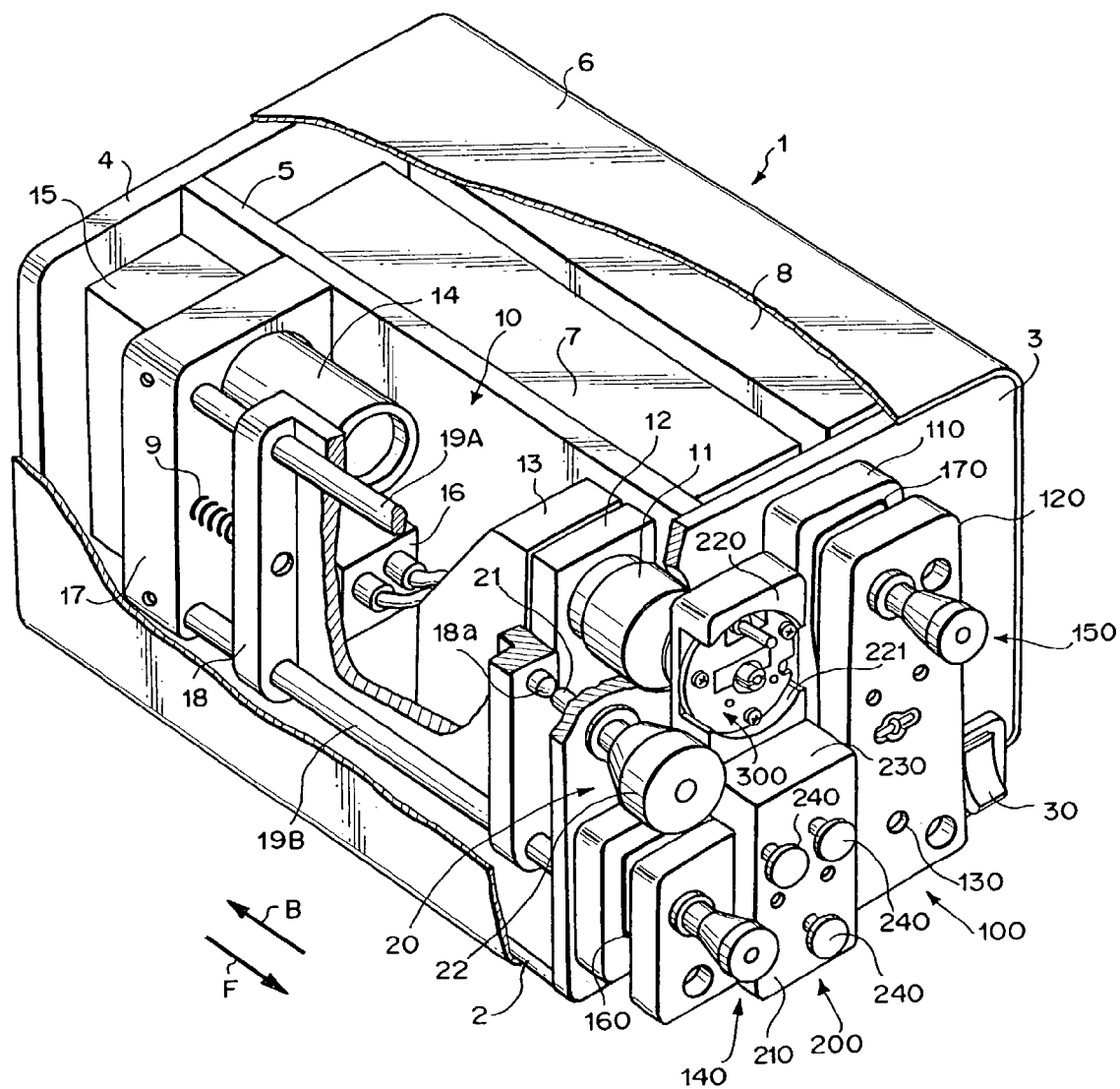
FIG. 7 is a perspective view of a microscopic interferometer apparatus equipped with the inclination adjusting apparatus shown in FIG. 1.

First, with reference to FIG. 7, an overall configuration of the microscopic interferometer apparatus in accordance with an embodiment of the present invention will be explained. FIG. 7 is a perspective view showing the microscopic interferometer apparatus in accordance with an embodiment of the present invention in a partly cutaway fashion.

The microscopic interferometer apparatus 1 shown in FIG. 7 comprises a main housing constituted by a bottom plate 2, a front plate 3 (depicted in a partly cutaway fashion), a rear plate 4, a partition 5, and a cover case 6 (depicted in a partly cutaway fashion), whereas a power supply 7, a control box 8, and a main system 10 are disposed within the main housing.

The main system 10 comprises an objective lens unit 11, a piezoelectric unit 12, a half mirror/light source unit 13, an imaging lens unit 14, a mirror box 15, and a CCD camera unit 16. Among them, the imaging lens unit 14, mirror box 15, and CCD camera unit 16 are attached to a stationary table 17 secured to the partition 5, whereas the objective lens unit 11, piezoelectric unit 12, and half mirror/light source unit 13 are attached to a focus table 18 (depicted in a partly cutaway fashion).

The focus table 18 is supported by upper and lower guide shafts 19A, 19B (depicted in a partly cutaway fashion) extending in parallel in back and forth directions (indicated by arrows B and F in the drawing), so as to be slidable back and forth. A coil spring 9 is disposed between the stationary table 17 and the focus table 18, so that the focus table 18 is urged forward (in the direction of arrow F in the drawing) by the elasticity of the coil spring 9.

The front plate 3 is provided with a focus adjustment screw 20 for moving the focus table 18 so as to carry out focus adjustment of the main system 10. This focus adjustment screw 20 comprises a screw shaft 21 threaded into an undepicted screw hole formed in the front plate 3 so as to be movable back and forth when rotating about its axis, and a knob 22 for rotating the screw shaft 21. The leading end face of the screw shaft 21 abuts against a semispherical protrusion 18a disposed at the front face part of the focus table 18. As the length of screw shaft 21 projected from the front plate 3 is changed by rotating the knob 22, the focus adjustment screw 20 can move the focus table 18 back and forth along the guide axes 19A, 19B, thus enabling focus adjustment.

The interferometer main system 10 having the above-mentioned configuration irradiates a minute sample (not depicted) held at a predetermined position in front of the objective lens unit 11 with illumination light from an undepicted light source separated from reference light, causes the object light reflected from the sample to interfere with the reference light, passes thus generated interference light through an imaging lens system (not depicted) within the imaging lens unit 14, and then forms an image of interference fringes onto an undepicted CCD. When forms and changes of thus obtained interference fringes are measured and analyzed, the three-dimensional measurement of the surface form of the sample and the physical property measurement thereof can be carried out. Employable as the interferometer main system 10 are various types such as those of Mireau, Michelson, and Linnik.

The front plate 3 is provided with an inclination adjusting apparatus 100. The inclination adjusting apparatus 100, which will later be explained in detail, comprises an L-shaped first base member 110 secured to the front plate 3, and a second base member 120 having an L-shape similar to the first base member 110 and opposing the first base member 110. The second base member 120 is supported so as to be inclinable with respect to the first base member 110 while using a support part 130 acting as a fulcrum, and is adapted to tilt about an axis extending in a substantially horizontal direction from the support part 130 and about an axis extending in a substantially vertical direction from the support part 130 by first and second adjusting parts 140, 150, respectively, so as to adjust the inclination with respect to the first base member 110.

A clamping apparatus holder 200 is attached to the second base member 120 of the inclination adjusting apparatus 100. The clamping apparatus holder 200 comprises a front part 210, a rear part 220, and a connecting part 230 connecting them, whereas the front part 210 is fastened by three attachment screws 240 to the second base member 120. The front part 210 of the clamping apparatus holder 200 is positioned on the front face side of the objective lens unit 11, whereas its center part is formed with a holder depression 211 for holding a clamping apparatus 300 therein. The clamping apparatus 300, which is used for holding a ferrule accommodated within an undepicted optical connector plug at a predetermined position in front of the objective lens unit 11 of the microscopic interferometer apparatus 1 shown in FIG. 7, is held by the inclination adjusting apparatus 100 by way of the clamping apparatus holder 200, whereby its inclined posture with respect to the microscopic interferometer apparatus 1 is adjusted by the inclination adjusting apparatus 100. The front plate 3 is further provided with a power switch 30 for turning ON/OFF the power of the microscopic interferometer apparatus 1.

Configuration of Inclination Adjusting Apparatus

Figure 1:
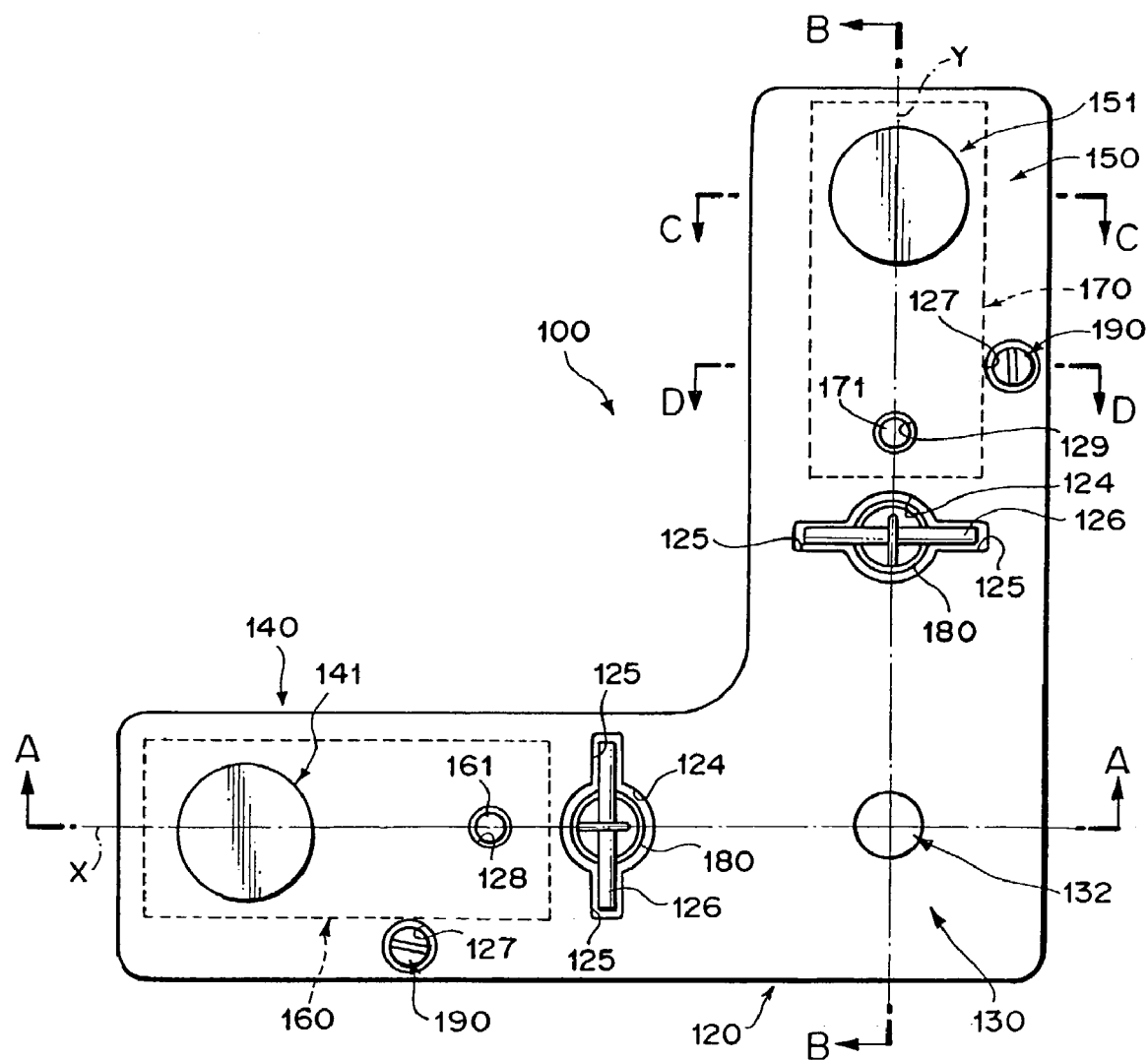
FIG. 1 is a front view of the inclination adjusting apparatus in accordance with an embodiment of the present invention.
Figure 2:
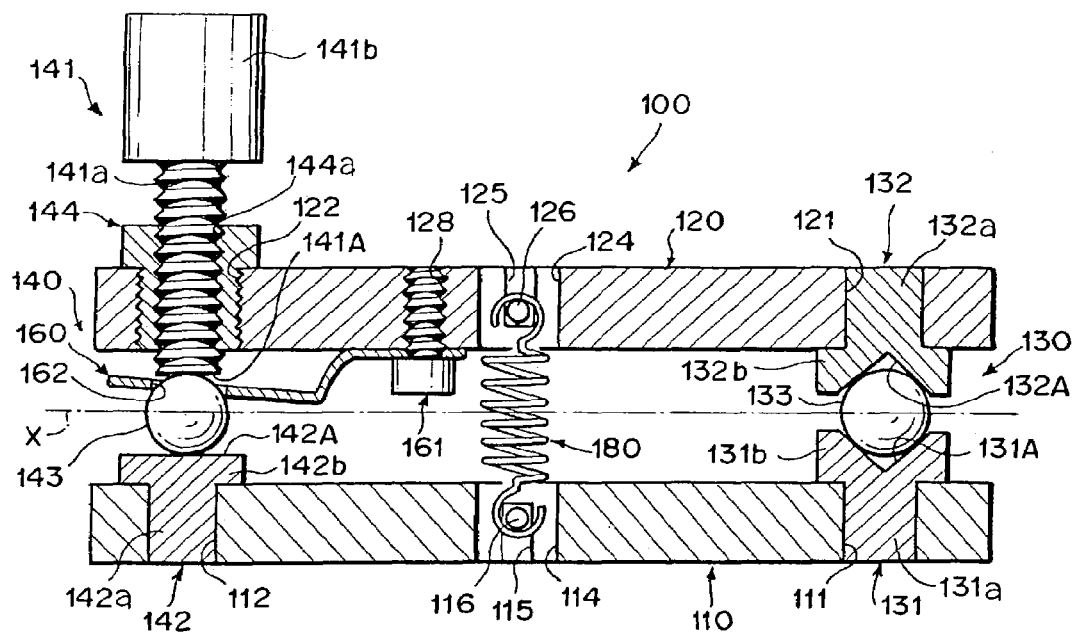
FIG. 2 is a sectional view taken along the line A—A of FIG. 1.
Figure 3:
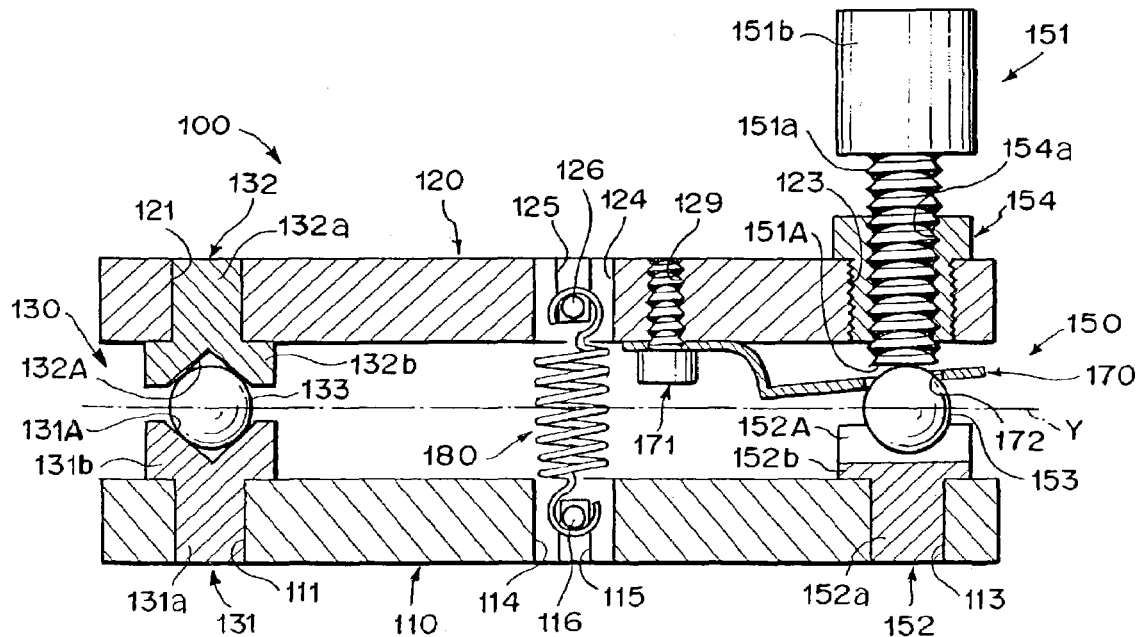
FIG. 3 is a sectional view taken along the line B—B of FIG. 1.
Figure 4:
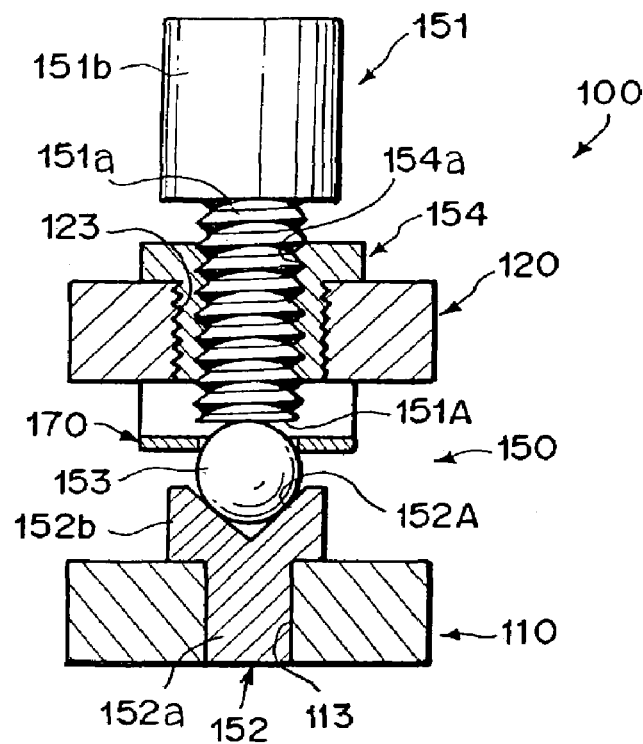
FIG. 4 is a sectional view taken along the line C—C of FIG. 1.
Figure 5:
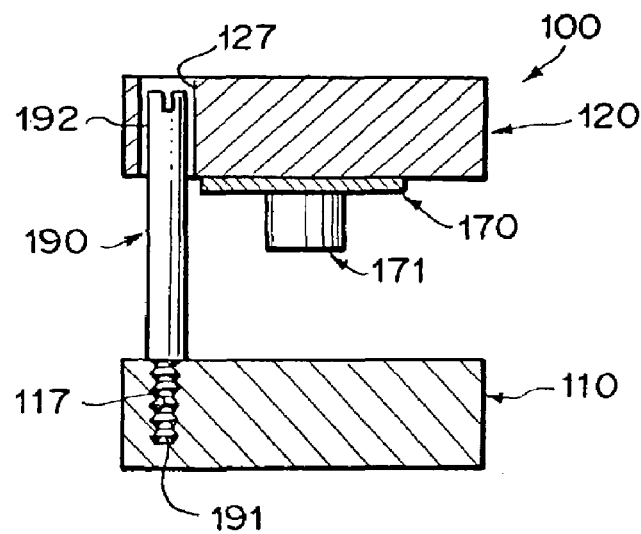
FIG. 5 is a sectional view taken along the line D—D of FIG. 1.
Figure 6:
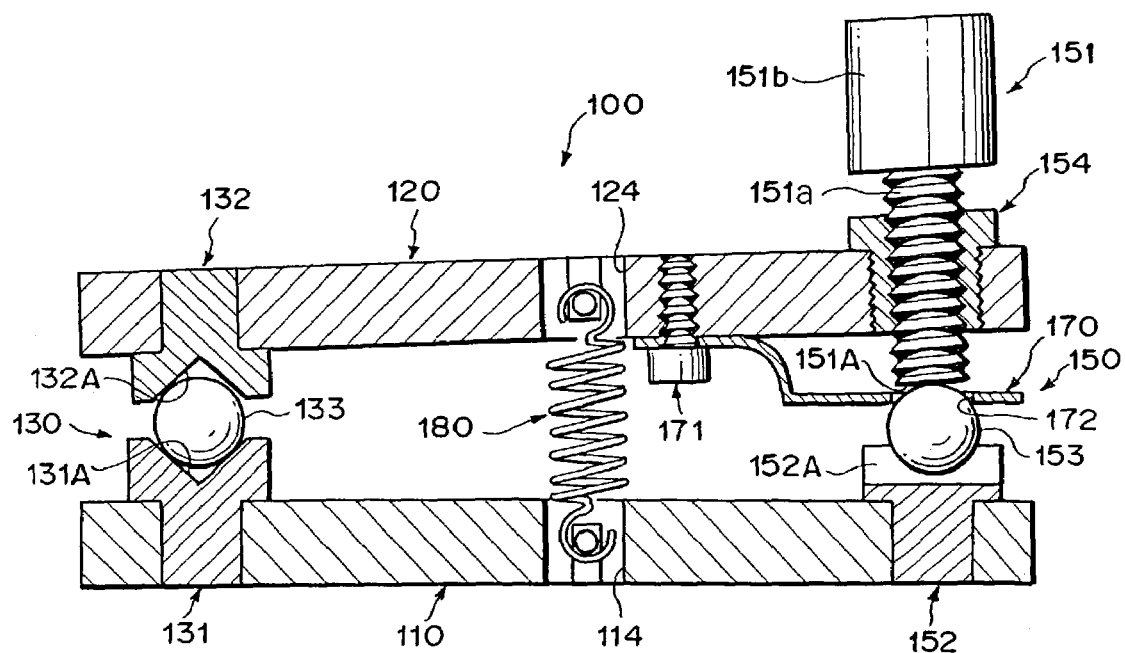
FIG. 6 is a sectional view for illustrating an operation of the inclination adjusting apparatus shown in FIG. 1.

The inclination adjusting apparatus 100 will now be explained in detail with reference to FIGS. 1 to 6. FIG. 1 is a front view of the inclination adjusting apparatus 100 in accordance with an embodiment of the present invention. FIG. 2 is a sectional view taken along the line A—A of FIG. 1. FIG. 3 is a sectional view taken along the line B—B of FIG. 1. FIG. 4 is a sectional view taken along the line C—C of FIG. 1. FIG. 5 is a sectional view taken along the line D—D of FIG. 1. FIG. 6 is a sectional view for illustrating an operation of the inclination adjusting apparatus 100. Here, FIG. 1 does not depict screw holes for mounting the clamping apparatus holder 200, working holes shown in FIG. 7 for inserting tools when securing the first base member 110 to the front plate 3 of the microscopic interferometer apparatus 1, and the like.

As mentioned above, the depicted inclination adjusting apparatus 100 comprises the first and second base members 110, 120 opposing each other, the support part 130 for supporting the first and second base members 110, 120 such that they are inclinable relative to each other, and the first and second adjusting parts 140, 150 for relatively inclining the first and second base members 110, 120 while using the support part 130 as a fulcrum.

As shown in FIGS. 2 and 3, the support part 130 comprises a first support member 131 secured to the first base member 110, a second support member 132 secured to the second base member 132, and a spherical member 133 disposed between the first and second support members 131, 132.

The first support member 131 is constituted by a shaft 131a inserted and secured into a hole 111 formed in the first base member 110, and a sphere-bearing part 131b integrally formed with the shaft 131a, whereas the sphere-bearing part 131b comprises a sphere-bearing surface 131A formed into a conical surface for supporting the spherical member 133. The second support member 132 is constituted by a shaft 132a inserted and secured into a hole 121 formed in the second base member 120, and a sphere-bearing part 132b integrally formed with the shaft 131a, whereas the sphere-bearing part 132b comprises a sphere-bearing surface 132A formed into a conical surface for supporting the spherical member 133.

The first and second support members 131, 132 are disposed such that the sphere-bearing surfaces 131A, 132A oppose each other. The sphere-bearing surfaces 131A, 132A hold the spherical member 133 therebetween, whereby the support part 130 supports the first and second base members 110, 120 in an inclinable manner while using the spherical member 133 as a fulcrum.

The first and second adjusting parts 140, 150 (see FIG. 2 for the first adjusting part 140, and FIGS. 3 and 4 for the second adjusting part 150) comprise adjustment screws 141, 151 disposed on the second base member 120 side; sphere-bearing members 142, 152 disposed on the first base member 110 side; rigid spherical members 143, 153 disposed between the sphere-bearing members 142, 152 and the adjustment screws 141, 151; and holding members 160, 170 for holding the spherical members 143, 153 at positions in contact with respective leading end faces 141A, 151A of the adjustment screws 141, 151.

The adjustment screws 141, 151 comprise screw shafts 141a, 151a, and knobs 141b, 152b for rotating the screw shafts 141a, 151a, and are attached to the second base member 120 by way of screw bushes 144, 154, respectively. The screw bushes 144, 154 are threaded into and held by respective screw holes 123, 124 formed in the second base member 120, and have screw holes 144a, 154a engaging the screw shafts 141a, 151a of the adjustment screws 141, 151. Namely, the adjustment screws 141, 151 are rotatably threaded into and held by the screw bushes 144, 154, whereby the lengths of projection of screw shafts 141a, 151a from the second base member 120 can be changed by rotating the knobs 141b, 151b.

The sphere-bearing members 142, 152 are constituted by shafts 142a, 152a inserted and secured into holes 112, 113 formed in the first base member 110, and sphere-bearing parts 142b, 152b integrally formed with the shafts 142a, 152a, whereas the sphere-bearing parts 142b, 152b comprise sphere-bearing surfaces 142A, 152A for supporting the spherical member 133. The sphere-bearing surfaces 142A, 152A have respective forms different from each other. Namely, the sphere-bearing surface 142A of the sphere-bearing member 142 is a plane substantially parallel to an axis X connecting the center of the spherical member 133 in the support part 130 and the center of the spherical member 143 in the first adjusting part 140, whereas the sphere-bearing surface 152A of the sphere-bearing member 152 is formed into a groove having a V-shaped cross section and extending in an axis Y connecting the center of the center of the spherical member 133 in the support part 130 and the center of the spherical member 143 in the second adjusting part 150.

The holding members 160, 170 are formed by bending elastic planar members so as to yield a cranked cross section, whereas their one end parts are secured to the second base member 120 by attachment screws 161, 171 threaded and held into respective screw holes 128, 129 formed in the second base member 120. The other end parts of the holding members 160, 170 are formed with holes 162, 172 having respective diameters smaller than those of the spherical members 133, 143. In a state where the spherical members 133, 143 are partly projected from the holes 162, 172, the holding members 160, 170 hold the spherical members 133, 143 at positions in contact with the leading end faces of the adjustment screws 141, 151 while their own elasticity pressing the spherical members 133, 143 against the sphere-bearing surfaces 142A, 152A of the sphere-bearing members 142, 152.

As shown in FIG. 1, thus configured first and second adjusting parts 140, 150 are disposed at respective positions separated from each other on the axes X, Y extending from the support part 130 in directions orthogonal to each other, and can relatively incline the first and second base members 110, 120 about the two axes X, Y so as to adjust relative inclinations of the first and second base members 110, 120 as will later be explained in detail.

The inclination adjusting apparatus 100 also comprises two urging members 180 for urging the first and second base members 110, 120 toward each other. Each urging member 180 is constituted by a coil spring having respective end parts held on the first base member 110 side and second base member 120 side. Specifically, as shown in FIG. 1, the second base member 120 is formed with two spring-bearing holes 124 at respective positions separated from each other in the directions of axes X, Y, whereas grooves 125 opposing each other are formed within each hole 124. A pin member 126 is disposed so as to bridge the opposing grooves 125 and engages one end part of the urging member 180. On the other hand, as shown in FIGS. 2 and 3, the first base member 110 is formed with two spring-bearing holes 114 at respective positions opposing the holes 124, whereas grooves 115 opposing each other are formed within each hole 114. A pin member 116 is disposed so as to bridge the opposing grooves 115 and engages the other end part of the urging member 180.

As shown in FIGS. 1 and 5, the inclination adjusting apparatus 100 further comprises stopper members 190 for preventing the first and second base members 110, 120 from shifting their positions relative to each other. As shown in FIG. 1, the stopper members 190 are disposed at two locations. As shown in FIG. 5, one end part of each stopper member 190 is threaded into and held by a screw hole 117 formed in the second base member 120, whereas the other end part 192 is inserted with a gap therearound into a hole 127 formed in the second base member 120. When a strong force acts on the first and second base members 110, 120 so that their positions relatively deviate from each other, the other end part 192 comes into contact with the inner periphery of the hole 127, whereby the stopper member 190 prevents them from further shifting their positions.

Operation of Inclination Adjusting Apparatus

Thus configured inclination adjusting apparatus carries out inclination adjustment as follows. First, when tilting the second base member 120 about the axis X with respect to the first base member 110, the adjustment screw 151 of the second adjusting member 150 positioned on the axis Y is rotated. The adjustment screw 151 rotates while the leading end face 151A is in slidable contact with the spherical member 153, thereby changing the length of projection of the screw shaft 151a from the second base member 120. During this period, the spherical member 153 is held between the sphere-bearing surface 152A of the sphere-bearing member 152A and the leading end face 151A of the adjustment screw 151 by the holding member 170. As the length of projection of the shaft 151a in the adjustment screw 151 changes, the second base member 120 supported in an inclinable fashion at the support part 130 tilts about the axis X, thereby changing its inclination with respect to the first base member 110 as shown in FIG. 6. When the first base member 110 tilts about the axis X, the spherical member 153 slightly slides along the axis Y while in contact with the sphere-bearing surface 152A formed into a groove having a V-shaped cross section.

When tilting the second base member 120 about the axis Y with respect to the first base member 110, the adjustment screw 141 of the second adjusting member 140 positioned on the axis X is rotated. The adjustment screw 141 rotates while the leading end face 141A is in slidable contact with the spherical member 143, thereby changing the length of projection of the screw shaft 141a from the second base member 120. As the length of projection of the shaft 141a changes, the second base member 120 tilts about the axis Y, thereby changing its inclination with respect to the first base member 110. During the period when the first base member 110 is tilted about the axis Y by the inclination adjustment, the spherical member 143 slightly slides on the sphere-bearing surface 142A while being held between the sphere-bearing surface 142A and the leading end face 141A of the adjustment screw 141 by the holding member 160.

In an adjustment screws whose leading end part is formed into a convex spherical surface in a conventional inclination adjusting apparatus, the center of the convex spherical surface may deviate from the axis of adjustment screw. When the adjustment screw is rotated while such an eccentric convex spherical surface is in contact with a sphere-bearing surface allowing the sliding only in a predetermined direction (along the axis Y) such as the sphere-bearing surface 152A, a force pressing the sphere-bearing surface in a direction substantially orthogonal to the predetermined direction may act, whereby the two base members may shift their positions relative to each other.

The leading end face 151A of the adjustment screw 151 abuts against the sphere-bearing surface 152A by way of the spherical member 153. The problem mentioned above does not occur, since the spherical member 153 is constructed separately from the adjustment screw 151. Therefore, the inclination adjusting apparatus 100 can carry out inclination adjustment with a high accuracy without shifting the first and second base members 110, 120 relative to each other.

As mentioned above, the inclination apparatus 100 is disposed at the front plate 3 of the microscopic interferometer apparatus 1 as shown in FIG. 7 and is configured so as to hold the clamping apparatus 300 by way of the clamping apparatus holder 200. While the ferrule accommodated within the optical connector plug is held by the clamping apparatus 300, the inclination adjustment of the inclination adjusting apparatus 100 is performed, whereby the inclination adjustment of the ferrule can be carried out with a high accuracy.

Configuration of Clamping Apparatus (First Embodiment)

Figure 8:
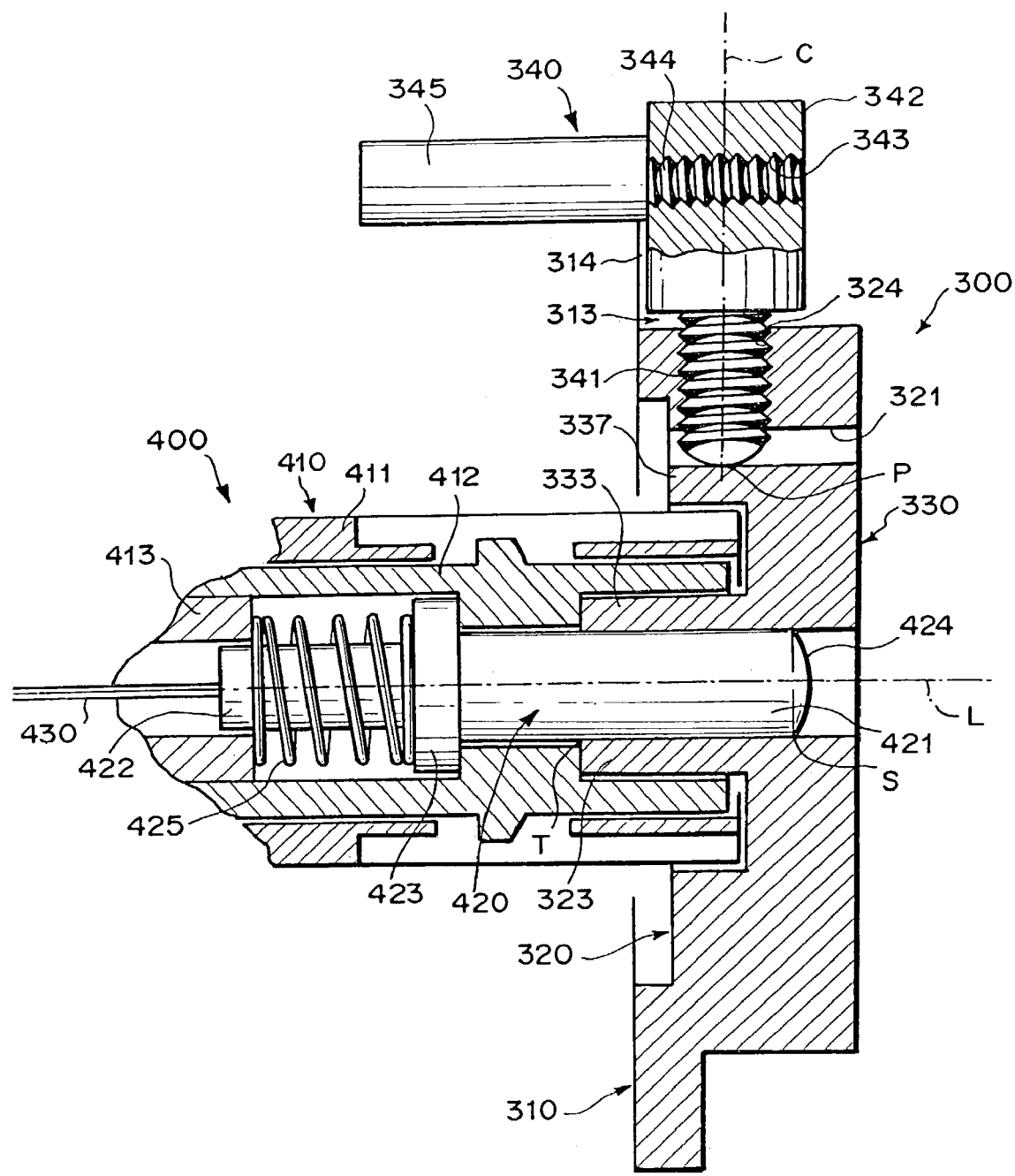
FIG. 8 is a sectional view of the clamping apparatus for an optical connector plug in accordance with a first embodiment of the present invention.
Figure 9:
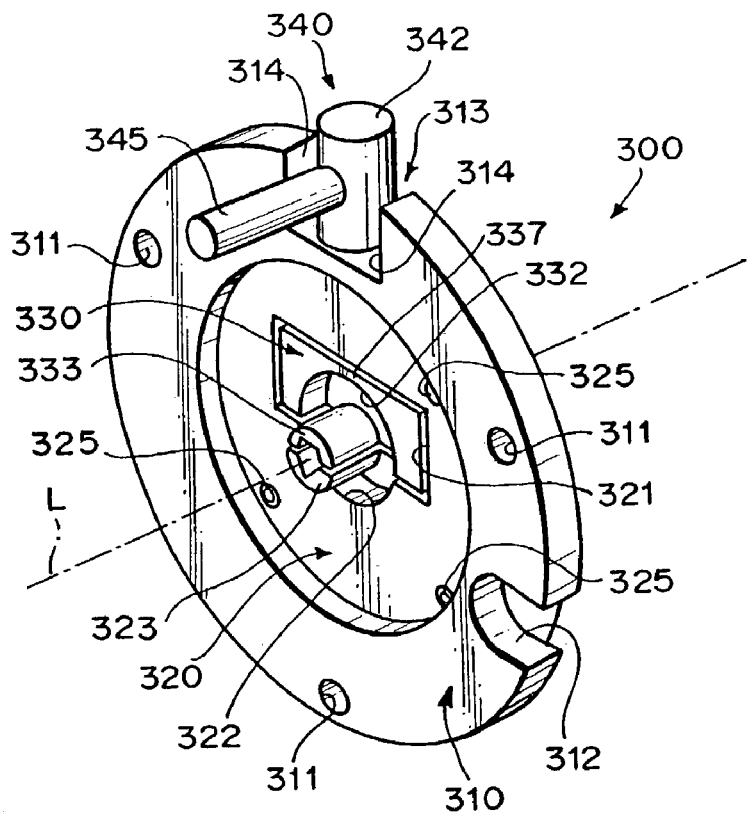
FIG. 9 is a perspective view showing the exterior of the clamping apparatus shown in FIG. 8.
Figure 10:
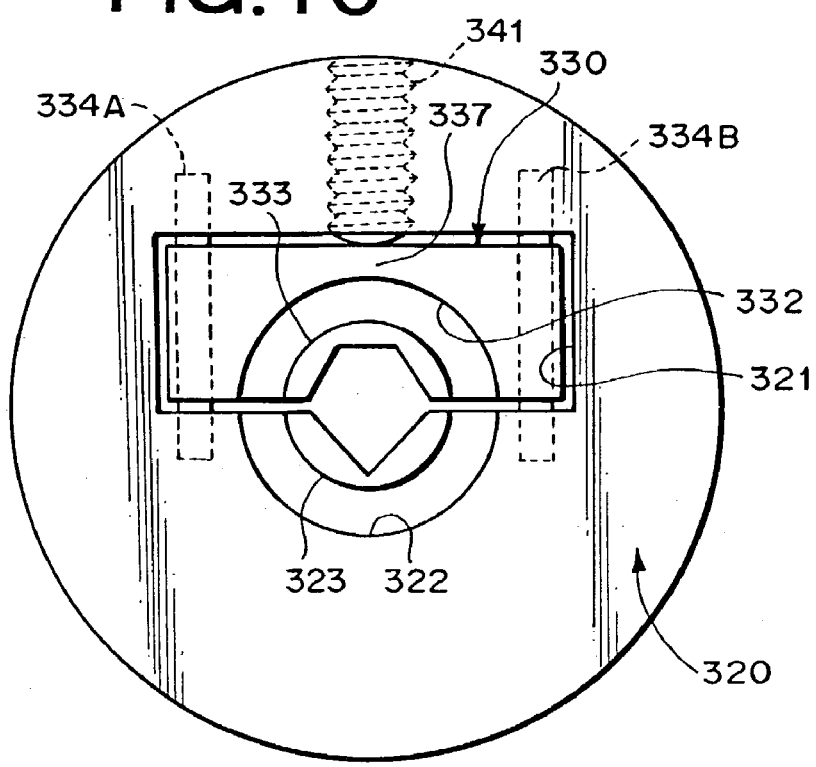
FIG. 10 is a partial front view of the clamping apparatus shown in FIG. 8.
Figure 11:
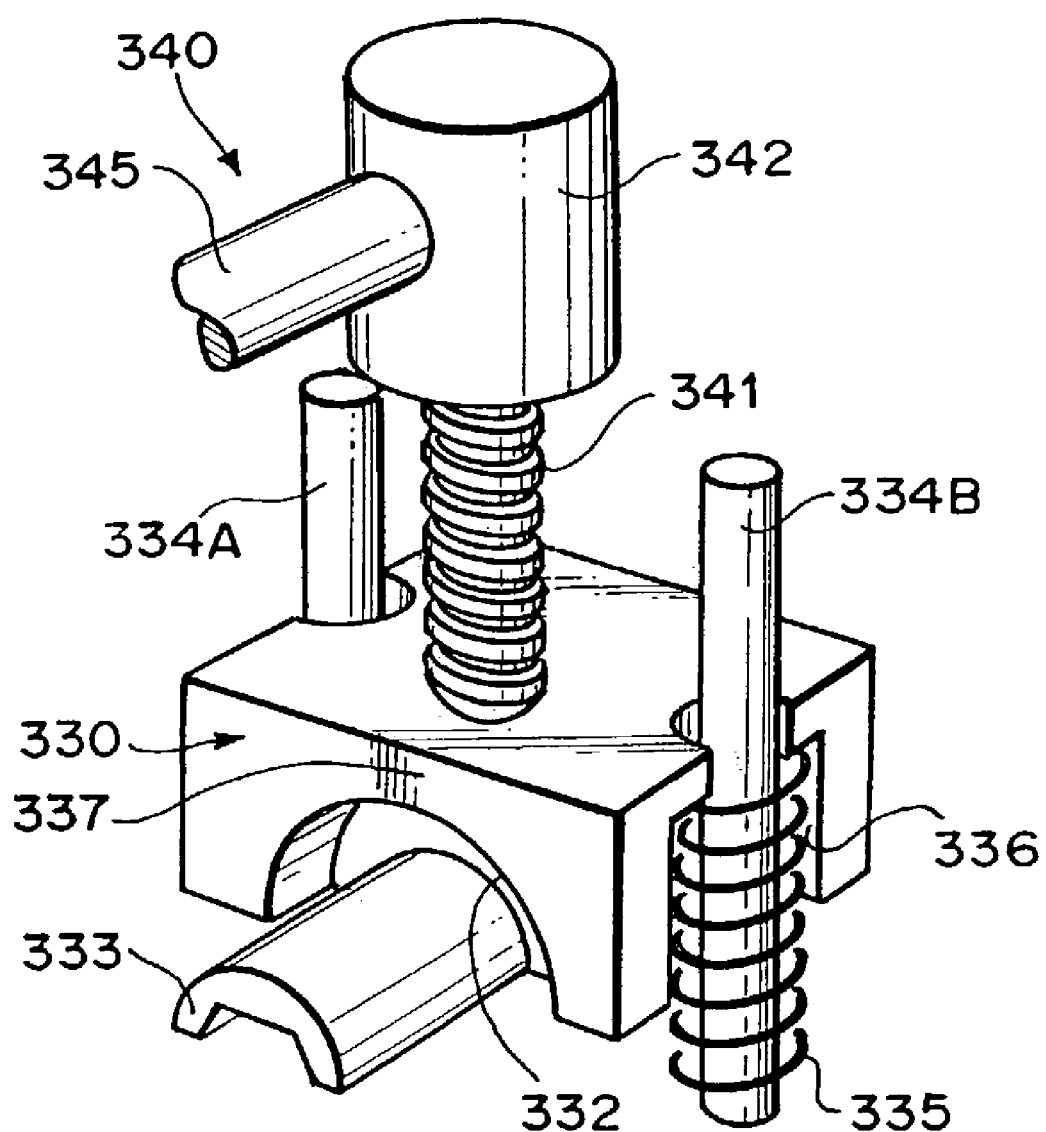
FIG. 11 is a perspective view showing a part of the clamping apparatus shown in FIG. 8.

The clamping apparatus 300 will now be explained in detail with reference to FIGS. 8 to 11. FIG. 8 is a sectional view of the ferrule clamping apparatus in accordance with a first embodiment of the present invention. FIG. 9 is a perspective view thereof. FIG. 10 is a partial front view thereof. FIG. 11 is a perspective view of a part thereof. Here, FIG. 8 shows a state holding a ferrule.

The depicted clamping apparatus 300 is used for holding a ferrule 420 accommodated within a tubular member 410 shown in FIG. 8 at a predetermined position in front of the objective lens unit 11 of the microscopic interferometer apparatus 1 shown in FIG. 7.

The tubular member 410 constitutes an optical connector plug 400 (which may be simply referred to as "plug 400" in the following) connected to another plug, which is not shown, by way of an undepicted sleeve. It comprises an inner tube 412 and an outer tube 411 slidable back and forth with respect to the inner tube 412, and accommodates the ferrule 420 therewithin.

The ferrule 420 holds an end part of a single-mode type optical fiber 430 at the outer diameter center of a ferrule body 421. A holder constituted by a cylindrical part 422 and a brim 423 is attached to a rear end part of the ferrule body 421. The ferrule body 421 is made of zirconia ceramics, whereas its leading end face 424 is PC-polished into a convex spherical form.

The ferrule 420 is accommodated within the tubular member 410 while in a state where a coil spring 425 is attached to the cylindrical part 422, and is restricted by a spring stopper ring 413 from dropping out rearward. The elasticity of the coil spring 425 urges the ferrule 420 forward (rightward in FIG. 8) at a predetermined pressure, thus making it easy for the leading end face 424 to come into close contact with the leading end face of another ferrule which is not depicted.

As shown in FIGS. 8 and 9, the clamping apparatus 300 comprises a base 310 having a substantially annular form, a support 320 formed like a disk thicker than the base 310, a shifter 330 movable up and down with respect to the support 320, and a pressing member 340 for pressing the shifter 330 from thereabove.

As shown in FIG. 9, the base 310 comprises three screw holes 311 and a cutout 312 for positioning. The screw holes 311 receive screws for attaching the clamping apparatus 300 to the claming apparatus holder 200 (see FIG. 7), whereas the cutout 312 is disposed such that the clamping apparatus 300 can be positioned with respect to the clamping apparatus holder 200 if the clamping apparatus 300 is set such that a positioning pin (not depicted) provided with the clamping apparatus holder 200 is inserted into the cutout 312. The top part of the base 310 is formed with a depression 313.

The support 320 is integrally formed with the base 310, whereas a rectangular window 321 is disposed at a position slightly shifted upward from the center part thereof. The front face of the support 320 is provided with a semicircular depression 322 adjoining the lower side of the window 321, whereas a first support piece 323 extending forward along the axis L of the clamping apparatus 300 is disposed within the depression 322. As shown in FIG. 9, the outer periphery of the first support piece 323 is formed into a semicylindrical surface, whereas the inner periphery thereof is formed into a groove having a V-shaped cross section. The cross section of the first support piece 323 shown in FIG. 8 is taken along the positions where the first support piece 323 and the ferrule 420 are in contact with each other.

The shifter 330 is formed separately from the base 310, and is disposed within the window 321 of the support 320. The front face of the shifter 330 is formed with a semicircular depression 332 formed symmetrical to the depression 322 of the support 320. Disposed within the depression 332 is a second support piece 333 extending forward in a state opposing the first support piece 323 across the axis L of the clamping apparatus 300. As shown in FIG. 9, the outer periphery of the second support piece 333 is formed into a semicylindrical face, whereas the inner periphery thereof is formed into a groove having a trapezoidal cross section.

More specifically, as shown in FIG. 10, the shifter 330 is movable up and down along guide shafts 334A, 334B vertically extending at left and right end parts within the window 321 of the support 320, respectively. As shown in FIG. 11, coil springs 335 (only one of which on the guide shaft 334B side is shown) for urging the shifter 330 upward are attached to the two guide shafts 334A, 334B, respectively, whereas the shifter 330 is formed with spring receiving depressions 336 for holding the upper end parts of the coil springs 335. When the shifter 330 is not pressed by the pressing member 340, because of the elasticity of the coil springs 335, the second support piece 333 of the shifter 330 is located at the clamp release position separated from one side of the ferrule 420 the other side of which is supported by the first support piece 323 of the support 320. The coil springs 335 may be located at positions different from those of the guide shafts 334A, 334B. Other elastic members such as rubber can also be used as means for urging the shifter 330 upward.

As shown in FIG. 8, the pressing member 340 comprises a screw shaft 341 engaging a screw hole 324 extending from the bottom face of the depression 313 formed at the top part of the base 310 to the window 321 formed in the support 320, a screw base 342 having a diameter greater than that of the screw shaft 341, and a lever member 345 having a screw shaft 344 engaging a screw hole formed in the screw base 342. As the lever member 345 is rotated about the axis C of the screw shaft 341, the pressing member 340 can press the shifter 330 downward while in a state where the spherical leading end face of the screw shaft 341 is in contact with the shifter 330, thereby displacing the second support piece 333 against the coil springs 335 from the clamp release position to the clamp position in contact with the above-mentioned one side of the ferrule 420.

As shown in FIG. 8, the shifter 330 is provided with a pressure receiving piece 337 extending so as to oppose the second support piece 333 across one side wall part of the tubular member 410 held by the clamping apparatus 330. The pressing member 340 is disposed such that the line of action (coinciding with the above-mentioned axis C) of a force passing its pressing point P (the intersection between the spherical leading end face of the screw shaft 341 and the pressure receiving piece 337) passes through the tubular member 410 so as to intersect the pressure receiving piece 337 and further pass through the area of ferrule 420 (area between points S and T in FIG. 8) supported by the first support piece 323. As shown in FIG. 9, the rotating area of the lever member 345 of the pressing member 340 is restricted by a stopper 314 constituted by left and right wall parts of the depression 313 formed at the top part of the base 310 of the clamping apparatus 300.

Operation of Clamping Apparatus

Thus configured clamping apparatus 300 holds the optical connector plug 400 as follows. First, the plug 400 is pressed against the front face of the clamping apparatus 300 such that the leading end part of the ferrule 420 is inserted between the first support piece 323 of the support 320 of the clamping apparatus 300 and the second support piece 333 of the shifter 330. Subsequently, the lever member 345 of the pressing member 340 is rotated, so that the leading end face of the screw shaft 341 of the pressing member 340 presses the pressure receiving piece 337 of the shifter 330, thus displacing the second support piece 333 of the shifter 330 from the clamp release position to the clamp position, whereby the second support piece 333 and the first support piece 323 hold the leading end part of the ferrule 420. Therefore, the plug 400 is held by the clamping apparatus 300 while in a state where the axis (not depicted) of the ferrule 420 coincides with the axis L of the clamping apparatus 300.

In this holding state, the first support piece 323 and second support piece 333 of the clamping apparatus 300 extend from the outside to inside of the leading end of the tubular member 410 while opposing each other. Therefore, the first and second support pieces 323, 333 can attain a longer chuck margin for the ferrule 420. Also, the spherical leading end face of the screw shaft 341 of the pressing member 340 presses the pressure receiving piece 337 of shifter 330 extending so as to overhang the second support piece 333. As a consequence, the line of action of the force of the pressing member 340 passes through the tubular member 410 so as to intersect the pressure supporting piece 337, and further passes through the area of ferrule 420 supported by the first support piece 323. Hence, even when the shifter 330 is pressed by the pressing member 340, the shifter 330 is kept from twisting (which rotates the shifter 330 clockwise in FIG. 8 when the line of action of the force passes outside of the area of ferrule 420 supported by the first support piece 323), whereby the ferrule 420 can be held reliably.

When taking out the plug 400 from the clamping apparatus 300, the lever member 345 of the pressing member 340 is rotated in the opposite direction, so as to stop the leading end face of the screw shaft 341 from pressing the shifter 330, thereby moving the second support piece 333 of the shifter 330 to the clamp release position, so that the first support piece 323 and second support piece 333 stop holding the ferrule 420, thus releasing the ferrule 420.

Configuration of Clamping Apparatus (Second Embodiment)

Figure 12:
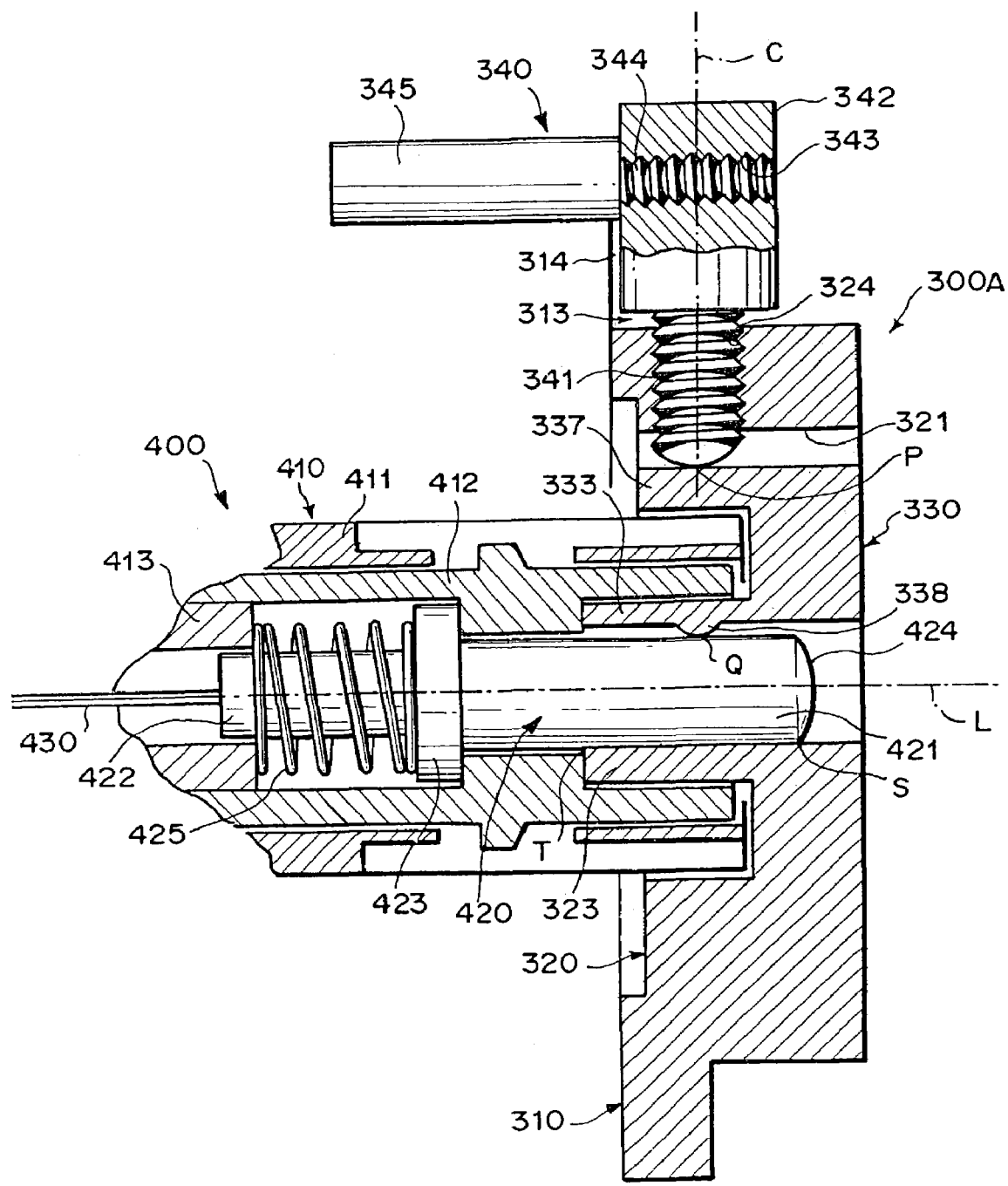
FIG. 12 is a sectional view showing the ferrule clamping apparatus in accordance with a second embodiment of the present invention.
Figure 13:
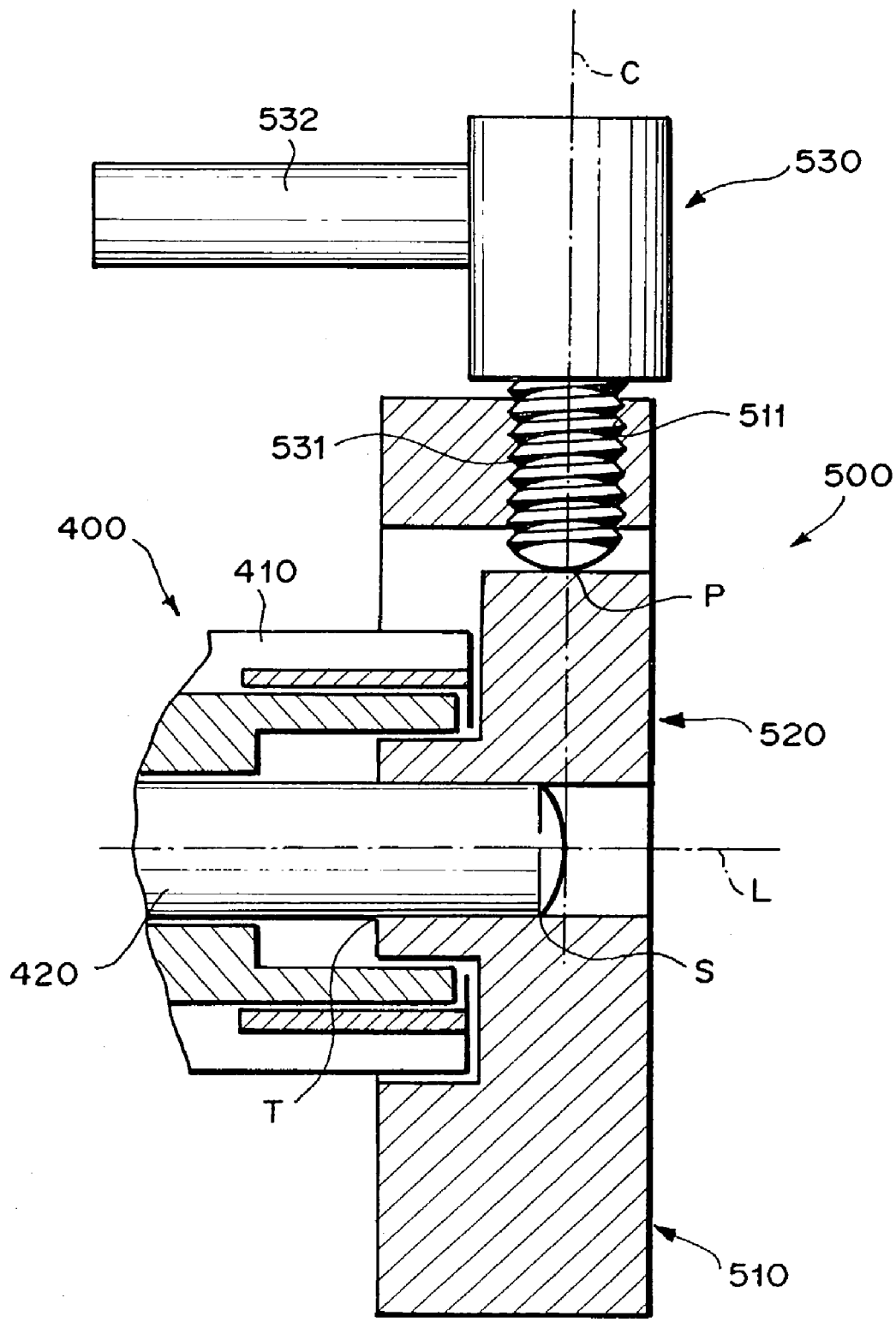
FIG. 13 is a sectional view of a conventional ferrule clamping apparatus.

The ferrule clamping apparatus in accordance with a second embodiment of the present invention will now be explained with reference to FIG. 12. FIG. 12 is a sectional view of the ferrule clamping apparatus in accordance with the second embodiment of the present invention. In the following, only differences from the first embodiment will be explained.

The configuration of the clamping apparatus 300A shown in FIG. 12 differs from that of the clamping apparatus 300 of the first embodiment in the following points. First, the pressure receiving piece 337 is formed longer than that of the first embodiment, whereby the pressure member 340 is disposed such that the line of action (coinciding with the axis C) of a force passing its pressing point P passes substantially a center part of the area of ferrule 420 (area between points S and P in FIG. 12) supported by the first support piece 323. This can homogenize the contact state between the first support piece 323 and the ferrule 420 within the supported area mentioned above, whereby the ferrule 420 can be held more stably than by the clamping apparatus 300 of the first embodiment.

The inner periphery (face opposing the first support piece 323) of the second support piece 333 is formed with a projection 338 at a position where the line of action of the force passes, whereas the second support piece 333 comes into contact with the ferrule 420 only at a contact point Q (intersection between the leading end of the projection 338 and the ferrule 420) in the projection 338. Though the second support piece 333 of the shifter 330 comes into contact with one side of the ferrule 420 by the whole inner periphery in the first embodiment, it is actually difficult for the whole surface to come into contact therewith uniformly because of the surface accuracy, thus yielding a strong possibility of becoming point contact. In this case, it is also difficult to see where point contact exists. Since where the second support piece 333 comes into contact with the side face of the ferrule 420 can be grasped reliably, the state of holding the ferrule 420 can be simulated beforehand in the second embodiment, and it is easy to design. Also, it is easy to make, since the inner periphery of the second support piece 333 is not required to be polished into a smooth surface with a high accuracy.

Though embodiments of the present invention are explained in the foregoing, the present invention can be modified in various manners without being restricted to the above-mentioned embodiments.

For example, though the first base member 110 of the inclination adjusting apparatus 100 is secured to the microscopic interferometer apparatus 1 whereas the adjustment screws 141, 151 are provided in the second base member 120 opposing the first base member 110, the adjustment screws in a mode in which one of the base members is fixed may be disposed in the fixed base member.

Though the holding members 160, 170 are constituted by respective members separate from each other, a single member may constitute a holding member for holding two spherical members.

Though the inclination adjusting apparatus 100 carries out the inclination adjustment of the ferrule within the optical connector plug in the microscopic interferometer apparatus 1 in the above-mentioned embodiments, the inclination adjusting apparatus of the present invention can also be used for carrying out the inclination adjustment of other samples in the microscopic interferometer apparatus, other measurement apparatus, and the like.

Though the clamping apparatus 300, 300A are explained as those holding the ferrule 420 having a PC-polished leading end face in the above-mentioned embodiments, they can hold ferrules having a leading end face polished into a plane perpendicular to the optical axis, and ferrules having a leading end face polished into a plane obliquely intersecting the optical axis. A ferrule of the type having an obliquely polished leading end face has a characteristic form at the leading end part of the plug such that which direction the oblique leading end face is oriented can be seen from the outlook of the plug holding the ferrule. When holding such a plug with the clamping apparatus 300, 300A, an adapter plate in conformity to the leading end form of the plug is mounted to the front face of plug and clamping apparatus 300, 300A. Screw parts 325 shown in FIG. 9 (not depicted in FIG. 10) are provided for mounting such an adapter plate.

Though the lever member 345 of the pressing member 340 is constituted by a rigid body in the above-mentioned embodiments, a part of the lever member 345 may be constituted by an elastically deformable member so as to bend when a predetermined rotating force or greater is exerted on the lever member 345. A coil spring or the like can be used as such an elastically deformable member.

Though the shifter 330 is formed separately from the support 320 in the above-mentioned embodiments, the shifter may be wholly or partly formed elastically deformable, so as to be displaceable upon elastic deformation, whereby the shifter and the support can be formed integrally.

Though only one projection 338 is formed on the inner periphery of the second support piece 333 at the position where the line of action of the force of the pressing member 340 passes in the second embodiment, a plurality of such projections may be provided symmetrically about the position where the line of action of the force passes, for example.

While the ferrule 420 is made of zirconia ceramics and holds the single-mode type optical fiber 430 at its axial part, the ferrule may be formed from other materials such as stainless steel and plastics, whereas the optical fiber to be held may be of multimode type.

As explained in detail in the foregoing, the inclination adjusting apparatus of the present invention comprises an adjustment screw, rotatably threaded into and held by one of two base members opposing each other, projecting a leading end part from the one base member toward the other base member; a sphere-bearing surface provided in the other base member so as to oppose the leading end face of the adjustment screw; and a rigid spherical member held between the adjustment screw and the sphere-bearing surface by a holding member; thereby achieving the following effects.

Namely, it can carry out the inclination adjustment with a high accuracy without shifting two base members relative to each other when rotating the adjustment screw, which may occur in an adjustment screw whose leading end face is formed into a convex spherical surface in a conventional inclination adjusting apparatus so that the center of the convex spherical surface deviates from the axis of the adjustment screw.

Since the microscopic interferometer apparatus in accordance with the present invention comprises the inclination adjusting apparatus of the present invention having the characteristic features mentioned above, it can carry out with a high accuracy the inclination adjustment of a minute sample such as a ferrule accommodated within an optical connector plug. This makes it possible to measure and analyze the minute sample such as a ferrule in a stable manner.

In the ferrule clamping apparatus of the present invention, a first support piece for supporting a ferrule from one side thereof, and a second support piece disposed so as to oppose the first support piece while being displaceable between a position in contact with the other side of the ferrule and a position separated therefrom extend from the outside to inside of the leading end of a tubular member along the axis of the ferrule, whereas the shifter having the second support piece is provided with a pressure receiving piece extending so as to oppose the second support piece across one side wall part of the tubular member. The pressing member presses the pressure receiving piece toward the ferrule, whereby the first and second support pieces hold the ferrule. Thus, the following effects are obtained.

Since the first and second support pieces extend into the tubular member, chuck margins can fully be secured for ferrules whose length of projection from the leading end of the tubular member is short. Since the pressure receiving piece formed in the shifter is pressed, the line of action of pressing force can pass through the area of ferrule supported by the first support piece, whereby the shifter can be kept from twisting, so that the ferrule accommodated within the tubular member can reliably be held in a predetermined posture at a high accuracy with a stability.

The microscopic interferometer in accordance with the present invention equipped with the clamping apparatus of the present invention having the characteristic features mentioned above can reliably hold the ferrule accommodated within the tubular member constituting the optical connector plug at a predetermined position in front of the objective lens system in a predetermined posture at a high accuracy with a stability. Therefore, the ferrule can be measured and analyzed stably at a high accuracy.

What is claimed is:

1. An inclination adjusting apparatus comprising:
   two base members opposing each other,
   a support part for supporting said two base members such that said two base members are relatively inclinable with respect to each other, and
   an adjusting part for relatively inclining said two base members with respect to each other while using said support part as a fulcrum;
   said adjusting part comprising:
      an adjustment screw rotatably threaded into and held by one of said two base members while projecting a leading end face from said one base member toward the other base member;
      a sphere-bearing surface provided in the other base member so as to oppose the leading end face of said adjustment screw;
      a rigid spherical member disposed between said leading end face of said adjustment screw and said sphere-bearing surface; and
      a holding member for holding said spherical member at a position in contact with said leading end face and said sphere-bearing surface, wherein said holding member holds said spherical member by pressing with its own elasticity;
      said adjustment screw being rotated in a state where said spherical member in contact with said leading end face and said sphere-bearing surface, so as to change the length of projection said adjustment screw from said one base member, thereby adjusting the relative inclination between said two base members.

2. An inclination adjusting apparatus according to claim 1, wherein said holding member has a hole having an inner diameter smaller than the diameter of said spherical member, and is disposed between said leading end face and said sphere-bearing surface such that said spherical member partly projects from said hole, so as to hold said spherical member.

3. An inclination adjusting apparatus according to claim 1, further comprising an urging member for urging said two base members toward each other.

4. An inclination adjusting apparatus according to claim 1, wherein two adjusting parts are disposed at respective positions separated from each other in directions orthogonal to each other from said support part, said sphere-bearing surface in one of said adjusting parts being formed into a flat surface in contact with said spherical member, said sphere-bearing surface in the other adjusting part being formed into a groove having a V-shaped cross section and extending in a direction connecting the other adjusting part and said support part.

5. An interferometer apparatus for observing interference fringes obtained by interference between object light carrying phase information of a sample and reference light,
   said interferometer apparatus comprising the inclination adjusting apparatus according to claim 1.

6. An interferometer apparatus according to claim 5, further comprising a clamping apparatus for holding said sample at a predetermined position, and a clamping apparatus holder for holding said clamping apparatus, said clamping apparatus being supported by said inclination adjusting apparatus by way of said clamping apparatus holder, an inclined posture of said clamping apparatus being adjusted by said inclination adjusting apparatus.

7. An interferometer apparatus according to claim 5, wherein said interferometer apparatus is microscopic interferometer apparatus.

* * * * *